(12) United States Patent
Liu

(10) Patent No.: US 10,950,121 B2
(45) Date of Patent: Mar. 16, 2021

(54) PASSIVE REBOUND SWITCH HAVING VARIABLE NUMBER OF BUTTONS

(71) Applicant: Guangdong Ebelong Intelligent Technology Co., Ltd., Guangdong (CN)

(72) Inventor: YuanFang Liu, Shenzhen (CN)

(73) Assignee: Guangdong Ebelong Intelligent Technology Co., Ltd., Guangdong (CN)

( * ) Notice: Subject to any disclaimer, the term of this patent is extended or adjusted under 35 U.S.C. 154(b) by 0 days.

(21) Appl. No.: 16/498,379

(22) PCT Filed: Mar. 29, 2018

(86) PCT No.: PCT/CN2018/081072
§ 371 (c)(1),
(2) Date: Sep. 26, 2019

(87) PCT Pub. No.: WO2018/177365
PCT Pub. Date: Oct. 4, 2018

(65) Prior Publication Data
US 2020/0035089 A1    Jan. 30, 2020

(30) Foreign Application Priority Data
Apr. 1, 2017    (CN) .......................... 201710213131.1

(51) Int. Cl.
*G08C 17/02* (2006.01)
*H01H 21/24* (2006.01)
(Continued)

(52) U.S. Cl.
CPC ............. *G08C 17/02* (2013.01); *H01H 21/08* (2013.01); *H01H 21/24* (2013.01); *H02N 2/18* (2013.01)

(58) Field of Classification Search
CPC ........ G08C 17/02; H01H 21/08; H01H 21/24; H02N 2/18
See application file for complete search history.

(56) References Cited

U.S. PATENT DOCUMENTS

2005/0030279 A1*    2/2005    Fu ....................... G06F 3/03543
345/156
2007/0152843 A1*    7/2007    Bursal .................. G04G 13/021
340/4.37

(Continued)

*Primary Examiner* — Thomas D Alunkal
(74) *Attorney, Agent, or Firm* — Raymond Y. Chan; David and Raymond Patent Firm

(57) ABSTRACT

A passive rebound switch includes an actuation button, an energy collecting module, a detection control, a housing, a power generation module, and a signal transmission circuit. The actuation button is detachably and pivotally connected to the housing. The power generation device, the signal transmission circuit, and the detection control are accommodated in an receiving chamber formed between the actuation button and the housing. When the actuation button is actuated to move in reciprocated rebounding movement, the energy collecting module is actuated to trigger the power generation module for converting mechanical energy into electrical energy to power the signal transmission circuit for transmitting a control signal. The energy collecting module is disposed between the actuation button and the power generation module. The detection switch pre-activates an I/O interface of an encoder device of the signal transmission circuit prior to the power generation module for generating the electrical power.

25 Claims, 9 Drawing Sheets

(51) Int. Cl.
*H01H 21/08* (2006.01)
*H02N 2/18* (2006.01)

(56) References Cited

U.S. PATENT DOCUMENTS

| | | | |
|---|---|---|---|
| 2007/0268920 A1* | 11/2007 | Allard-Jacquin | H04W 92/02 370/401 |
| 2008/0204409 A1* | 8/2008 | Wright | G06F 3/0445 345/157 |
| 2009/0085359 A1* | 4/2009 | Mabuchi | H02K 35/02 290/1 R |
| 2010/0052332 A1* | 3/2010 | Pang | G08C 23/04 290/1 A |
| 2014/0265640 A1* | 9/2014 | Ruff | H01H 23/08 307/139 |
| 2015/0054383 A1* | 2/2015 | Kang | H03K 17/967 310/319 |

* cited by examiner

PASSIVE REBOUND SWITCH HAVING VARIABLE NUMBER OF BUTTONS

CROSS REFERENCE OF RELATED APPLICATION

This is a non-provisional application that claims priority to international application number PCT/CN2018/081072, international filing date Mar. 29, 2018, which claims priority to Chinese application number CN 201710213131.1, filing date Apr. 1, 2017, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to electric switches, and more particularly to a passive rebound switch, which is able to be installed into a wall surface and selectively alter different number of buttons.

Description of Related Arts

Generally, a standard wall switch has a significant advantage of installing into a wall surface easily. The standard wall switch refers to a wall-mounted push button switch that meets the national building standards or electrical product standards. For example, a length and a width of the switch are 86 mm for European standard, and a length and a width of the switch are 120 mm and 70 mm respectively for Japanese standard. There are also different walls switches for home and office use, such as in American standard. The common ground for these wall switches is easy to use regardless of age, such that the wall switches have been widely used in buildings all over the world. However, installing the conventional wall switch requires a pre-wiring system, wherein the wall switch is electrically connected to a power grid and an electric appliance, such as an electric lamp. Accordingly, the labor cost is relatively high and the labor time is relatively long for installing the wiring system behind the wall surface. In some cases, it is difficult to install the wiring system behind the hard surface, such as a tempered glass surface. Furthermore, it is dangerous to install the wiring system in the buildings, especially long wires may cause fire or other accidents related to electrical problems. The conventional wall switches cannot be used in wet or humid places such as bathrooms. In other words, there are lots of unsafe factors for the conventional wall switches.

The existing passive wireless switches or powerless wireless switches are expensive even though the switches are able to control some smart appliances. Due to the complexity of the mechanical design of the passive wireless switches, the cost thereof is relatively high, the reliability thereof is not high, and the practical application thereof is limited. Unlike the conventional wall switch to provide multiple button configurations (for example, four button configuration), the number of buttons per switch is limited for the passive wireless switch. Accordingly, the existing rebound type passive wireless switch can only configure to have 2 buttons, such that it is difficult to control multiple electric appliances, such as multiple light appliances, in the building, unless multiple switches are installed. However, increasing the number of switches will increase the cost. The operation mode and actuation pressing force of the existing passive wireless switches are quite different from those of the traditional rebound type wall switches. For example, the actuation pressing force of the existing passive wireless switches is larger than that of the traditional rebound type wall switches. Therefore, whether it is economical or practical view, the existing passive wireless switches cannot reach the level of traditional switches. Therefore, the existing passive wireless switches are need to improve and are not popular to be used in the buildings.

In addition, whether it is the existing passive wireless switches or the traditional rebound type wall switches, the number of buttons is preset at the production and cannot be changed thereafter. In other words, the manufactures must build different molds and/or additional steps in the manufacturing process for manufacturing the switch with different buttons, so as to increase the material and manufacturing cost of the switch. On the other hand, the merchants also need to determine the demand for different number of button switches according to the market research, and the consumers must also consider the need of the switch with different numbers of buttons. In fact, it is always a difference between the estimated quantity and the actual demand for the switch so as to cause the waste of material and labor cost.

SUMMARY OF THE PRESENT INVENTION

The invention is advantageous in that it provides a passive rebound switch with changeable button configuration, wherein the user is able to selectively arrange or change different numbers of actuation buttons according to the actual need of the user.

Another advantage of the invention is to provide a passive rebound switch with changeable button configuration, wherein the actuation buttons can individually or concurrently actuate the power generation module to reduce the manufacturing cost and the energy consumption requirements of the circuit.

Another advantage of the invention is to provide a passive rebound switch with changeable button configuration, which does not require any wiring configuration to simplify the installation configuration, to save the installation time and labor, and to enhance the safety structure.

Another advantage of the invention is to provide a passive rebound switch with changeable button configuration, which reduces the manufacturing cost, enhances different button arrangements when increasing number of buttons, and enhances the reliability of the switch.

Another advantage of the invention is to provide a passive rebound switch with changeable button configuration, which provides multiple rebounding buttons to independently control different light appliances so as to significantly reduce the installation and utility cost of each lighting control loop and to improve resource utilization.

Another advantage of the invention is to provide a passive rebound switch with changeable button configuration, wherein the size of the passive rebound switch is standard and the installation method thereof is the same as the conventional switch, such that the operation and feeling of the passive rebound switch is the same as the conventional switch.

Another advantage of the invention is to provide a passive rebound switch with changeable button configuration, wherein two consequent electrical energies are generated in response to the actuation of the actuation button and the reset of the actuation button. At the same time, the consequent electrical energies are combined together by an energy synthesizer to fully utilize the power generation module for maximizing the power output, such that the command circuit can transmit the wireless signal with higher RF power, and the control is more reliable.

Another advantage of the invention is to provide a passive rebound switch with changeable button configuration, which is able to generate a relative large electrical output so as to omit the use of expensive low-power communication circuit. The present invention is able to use a conventional, relatively low-cost, high-power communication circuit, such as a single transistor of a wireless communication circuit, for normally operating so as to reduce manufacturing cost and operating cost of the present invention.

Another advantage of the invention is to provide a passive rebound switch with changeable button configuration, which can be directly attached to the solid surface by using double-sided tape, and can open up two sides of the switch to affix at a standard junction box via screws for embedding in the wall surface as the standard conventional switch. Therefore, the installation of the present invention is very flexible as to meet the existing installation of the conventional switch.

Another advantage of the invention is to provide a passive rebound switch with changeable button configuration, wherein by increasing the numbers of actuation buttons and detection controls, the button arrangement is expandable to selectively adjust the number of control channels. Therefore, more independent control channels can be formed with less cost, and more electrical appliances can be controlled, such that one single switch can provide the functions of the conventional multiple switches.

Another advantage of the invention is to provide a passive rebound switch with changeable button configuration, which comprises at least a cloth covered key constructed with at least one actuation button detachably and pivotally coupled at the housing, such that the number of actuation button can be selectively configured according to the need of the user.

Another advantage of the invention is to provide a passive rebound switch with changeable button configuration, which comprises at least an energy collecting module, wherein the reciprocated rebounding movements of the actuation buttons are arranged to individually or concurrently drive the energy collecting module, such that the energy collecting module is configured to drive the power generation module to convert the mechanical energy into the electrical energy for supplying electrical power to at least one signal transmission module. Then, the signal transmission module is powered to emit at least one control signal.

Another advantage of the invention is to provide a passive rebound switch with changeable button configuration, wherein the actuation buttons are able to individually or concurrently drive the energy collecting module, such that the energy collecting module is able to drive one of the power generation modules so as to minimize the production cost and the energy consumption for the circuit.

According to the present invention, the foregoing and other objects and advantages are attained by a passive rebound switch, which comprises:

at least a cloth covered key, at least one energy collecting module, at least one detection control, at least one housing, at least one power generation module, and at least one signal transmission module, wherein the cloth covered key comprises at least an actuation button detachably and pivotally coupled at the housing, wherein a receiving chamber is formed between the cloth covered key and the housing to receive the energy collecting module. the signal transmission module, and the detection module in the receiving chamber, wherein the actuation button is actuated with a reciprocated rebounding movement to trigger the energy collecting module for converting a mechanical energy into an electrical energy so as to power the signal transmission module, wherein the energy collecting module is disposed between the actuation button and the power generation module, wherein the detection control is configured to pre-electrify an I/O interface of an encoder of the signal transmission module before the power generation module generates the electrical energy, wherein the signal transmission module is configured for transmitting at least one control signal after the signal transmission module is powered.

In one embodiment, the actuation button is arranged for applying pressing force or pressure on the energy collecting module.

In one embodiment, the energy collecting module is configured to drive the power generation module for generating electricity.

In one embodiment, the actuation button of the cloth covered key and the housing are pivotally connected with each other to enable the actuation button being detachably coupled to the housing in a reciprocated rebounding movement.

In one embodiment, the actuation button of the cloth covered key comprises a button pivot shaft, wherein the housing has at least one pivot shaft slot formed at one side of the housing corresponding to the button pivot shaft. The button pivot shaft is engaged with the pivot shaft slot to enable the actuation button being detachably and pivotally coupled to the housing.

In one embodiment, the actuation button comprises a pivot shaft support formed at a bottom side thereof to support the button pivot shaft, wherein the housing has pivot shaft portion defined at an inner side surface to form the pivot shaft slot.

In one embodiment, the actuation button further comprises an energy collecting module presser formed at an inner side thereof, wherein in response to the reciprocated rebounding movement of the actuation button, the energy collecting module presser is configured to press at the detection control in order to trigger the detection control.

In one embodiment, the passive rebound switch further comprises an interior casing assembly, wherein the power generation module is sealed and received between the interior casing assembly and the housing. An auxiliary contact terminal is provided at the interior casing assembly, wherein the energy collecting module presser is driven to press against the auxiliary contact terminal in order to drive the auxiliary contact terminal to contact with the energy collecting module. Therefore, the energy collecting module is actuated to press against the power generation module to move and to convert the mechanical energy into the electrical energy.

In one embodiment, the detection control is configured to pre-switch on the I/O interface of the encoder of the signal transmission module for transmitting the encoding control command before the power generation module generates the electrical energy.

In one embodiment, the actuation button further comprises a detection control presser provided at an inner side thereof, wherein the detection control presser is configured to press against detection control in order to trigger the detection control.

In one embodiment, the detecting control comprises a conductive contact terminal and an I/O port, wherein the I/O port is operatively connected to the signal transmission module, wherein when the detection control is triggered by the actuation button, the I/O port is in contact with the conductive contact terminal, the I/O interface of the encoder is electrified, such that the preset code is generated by the encoder and is transmitted by the signal transmission module.

In one embodiment, the passive rebound switch further comprises an interior casing assembly, wherein the power generation module is sealed and received between the interior casing assembly and the housing. A buffering element is provided at the interior casing assembly, wherein the detection control presser of the actuation button is actuated to press against the buffering element in order to press against detection control to trigger the detection control.

In one embodiment, the buffering element is further configured to support the actuation button in an idle position so as to remain the actuation button in a stationary manner especially when another actuation button is actuated and pressed.

In one embodiment, the detection control further comprises a conductive contact terminal and an I/O port, wherein the I/O port is disposed at the signal transmission module while the conductive contact terminal is disposed at a bottom of the buffering element.

In one embodiment, the actuation button further has a button pressing portion formed at an inner side thereof, wherein the detection control is operatively linked to the signal transmission module for transmitting the control signal, wherein the button pressing portion of the actuation button is configured to press and actuate the power generation module to generate the electrical energy and to trigger detection control.

In one embodiment, the actuation button further comprises an energy collecting module presser and a pressing extension rib, wherein the energy collecting module presser is protruded from a mid-portion of the pressing extension rib. The energy collecting module presser is configured to press against the power generation module, while one end portion of the pressing extension rib is configured to press and trigger the detecting control.

In one embodiment, each of the actuation buttons is configured to individually or concurrently drive the energy collecting module, wherein the energy collecting module is configured to drive the power generation module in order to actuate the power generation module for converting the mechanical energy into the electrical energy.

In one embodiment, the energy collecting module further comprises a main pressing portion and two side wing portions spacedly and perpendicularly extended from two ends of the main pressing portion, wherein the power generation module is disposed between the side wing portions. When the external force is applied at the actuation button, the main pressing portion of the energy collecting module is pressed to drive the power generation module.

In one embodiment, the energy collecting module further comprises at least a forcing arm, wherein one end of each of the side wing portions is extended from the main pressing portion and another end of each of the side wing portions is bent vertically and downwardly to form the forcing arm. The main pressing portion is pivotally moved with respect to the forcing arm as a pivot point.

In one embodiment, the passive rebound switch further comprises an interior casing assembly, wherein the power generation module is sealed and received between the interior casing assembly and the housing. The actuation button is driven to press the interior casing assembly in order to actuate the energy collecting module.

In one embodiment, at least one auxiliary contact terminal is provided at the interior casing assembly to press against the energy collecting module so as to drive and trigger the power generation module.

In one embodiment, a contacting protrusion point is defined at a bottom side of the auxiliary contact terminal, wherein the energy collecting module further comprises a main pressing portion and two side wing portions spacedly and perpendicularly extended from two ends of the main pressing portion, wherein the power generation module is disposed between the side wing portions. When the external force is applied at the actuation button, the power generation module is pressed and driven by the contacting protrusion point.

In one embodiment, the interior casing module comprises at least an inner casing cover, wherein the inner casing cover and the housing form a waterproof chamber for providing a waterproofing function, and for accommodating the power generation module and the signal transmission module.

In one embodiment, the interior casing assembly further comprises a waterproof wall formed at a bottom side thereof, wherein the housing has at least a waterproof groove formed at an inner side thereof. The interior casing assembly further comprises at least an inner casing fastener provided at a side thereof. The housing further has a casing waterproof portion defining the waterproof groove thereat. The housing further comprises a housing fastener provided at an outer periphery of the casing waterproof portion, wherein the housing fastener and the inner casing fastener are detachably coupled with each other by means of snap-fit connection manner to tightly seal and couple the waterproof wall at the waterproof groove, so as to seal and couple the interior casing assembly with the housing with the waterproof chamber in a waterproof manner.

In one embodiment, the interior casing assembly comprises at least a first inner casing and at least a second inner casing sealed and coupled with each other, wherein the waterproof wall is disposed at a bottom of the first inner casing, and the inner casing fastener is formed at a side of the second inner casing.

In one embodiment, the interior casing assembly comprises at least a first inner casing and at least a second inner casing. The first inner casing further has a first waterproof portion and has a first inner casing hole. The second inner casing further has a second waterproof portion and a second inner casing hole. The first waterproof portion is tightly sealed and enclosed to the second inner casing hole, and the second waterproof portion is tightly sealed and enclosed to the first inner casing hole.

In one embodiment, at least one auxiliary contact terminal is provided at the first waterproof portion of the first inner casing, wherein each of the energy collecting module pressers is configured to press and drive the power generation module through the auxiliary contact terminal so as to actuate the power generation module for converting the mechanical energy as the external force into the electrical energy.

In one embodiment, the detection control is configured to receive the control command and to activate the signal transmission module to transmit the control signal, wherein the detection control is received in the waterproof chamber formed between interior casing assembly and the housing.

In one embodiment, at least one buffering element is provided at the first waterproof portion of the first inner casing, wherein the actuation button is pressed to drive the buffering element, such that the buffering element is pressed to drive and trigger the detection control.

In one embodiment, the first inner casing is made of a soft rubber material and the second inner housing is made of plastic material.

In one embodiment, each of the actuation buttons of the cloth covered key is configured to individually or concurrently press the interior casing assembly to actuate the energy collecting module, such that the power generation module is driven and actuated by the energy collection module for converting the mechanical energy into the electrical energy.

In one embodiment, the passive rebound switch further comprises at least a paddling member arranged for being driven by the cloth covered key to drive the power generation module, so as to actuate the power generation module for converting the mechanical energy into the electrical energy.

In one embodiment, the passive rebound switch further comprises at least a restoring element for generating a resetting movement of the power generation module.

In one embodiment, the signal transmission module further comprises at least one energy collecting circuit to collect electrical energy generated by the power generation module every time.

In accordance with another aspect of the invention, the present invention comprises a passive rebound switch, which comprises:

a power generation module, at least an energy collecting module, at least a detachable button, at least a housing, at least a signal transmission module, and at least a restoring element, wherein the energy collecting module is disposed between the detachable button and the power generation module, wherein the detachable button is actuated in a reciprocated rebounding movement to drive and actuate the energy collecting module, wherein the energy collecting module is configured to drive and actuate the power generation device for converting a mechanical energy into an electrical energy so as to electrically power the signal transmission module for transmitting at least one control signal, wherein the restoring element is configured to rest the energy collecting module back to its original position.

In accordance with another aspect of the invention, the present invention comprises a self-powering a passive rebound switch, comprising the following steps.

(A) Apply an external force on at least one of the actuation buttons.

(B) Press at least one detection control by the actuation button.

(C) Press at least one energy collecting module by the actuation button.

(D) Activate the power generation module by the energy collecting module.

(E) Generate a first electrical energy by the power generation module.

(F) Electrify at least one signal transmission module to generate a first control signal.

(G) Reset the actuation button to move the actuation button back to its original position by a resetting device generating a rebounding force which is opposite to the external force.

(H) Generate a second electrical energy by the power generation module in response to the rebounding force of the resetting device.

(I) Electrify the signal transmission module to generate a second control signal.

(J) Reset the energy collecting module and the power generation module back to their original position.

In one embodiment, the energy collecting module, the detection control, the signal transmission module, the resetting device and the power generation module are sealed and received in the waterproof chamber of the passive rebound switch.

DETAILED DESCRIPTION OF THE PREFERRED EMBODIMENT

Figure 1:
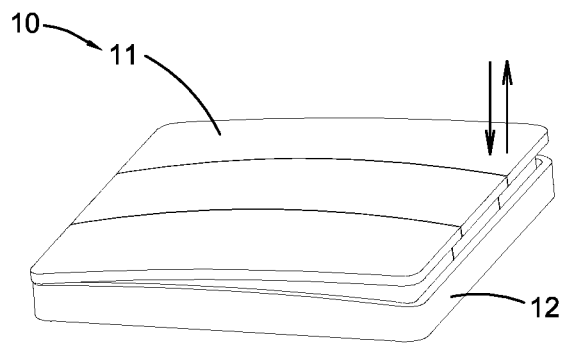
FIG. 1 is a perspective view of a passive rebound switch according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIGS. 1 to 9 of the drawings, a passive rebound switch, i.e. a powerless rebound switch, according to a preferred embodiment of the present invention is illustrated, wherein the passive rebound switch is adapted to selectively alter a number of button, and is configured to mount on a wall surface as an example. The passive rebound switch comprises a power generation module 50, an energy collecting module 58, a signal transmission module 20, a cover assembly 10, a plurality of detection controls 40 (such as three), and a housing 12.

The cover assembly 10 comprises a plurality of actuation buttons or detachable buttons 11 aligned side-by-side. In one embodiment, the cover assembly 10 is constructed to have three actuation buttons 11, wherein each of the actuation buttons 11 is configured as a cover panel to form a portion of top casing of the passive rebound switch. In other words, the actuation buttons 11 are placed side-by-side to form the top casing of the passive rebound switch. The housing 12 forms a bottom casing of the passive rebound switch. Accordingly, the above mentioned components are received in a receiving chamber as a resilient cavity formed between the actuation buttons 11 and the housing 12. According to the preferred embodiment, the receiving chamber is formed between the three actuation buttons 11 and the housing 12. The power generation module 50, the energy collecting module 58, the signal transmission module 20, and the detection controls 40 are received in the receiving chamber. When each of the actuation buttons 11 is subjected to an external force, such as a pressing force applied by an operator's hand, one side of each of the actuation buttons 11 can be driven to move in an up-and-down reciprocating movement.

Figure 2:
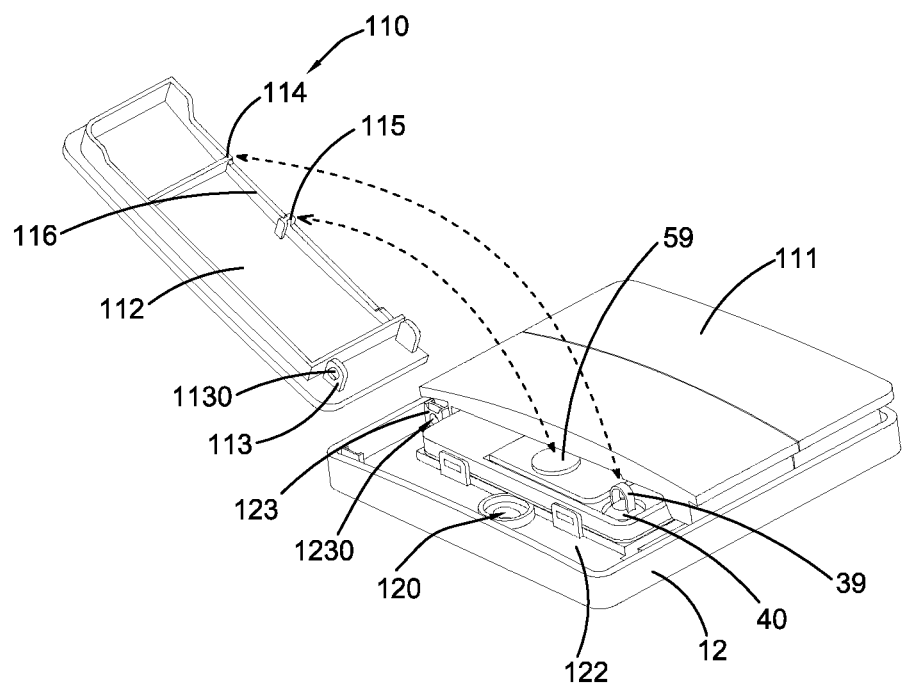
FIG. 2 is an exploded perspective view of the passive rebound switch according to the above preferred embodiment of the present invention, illustrating one of the actuation buttons being opened.

FIG. 2 illustrates one of the actuation buttons 11 being detached from the housing 12. Each of the actuation buttons 11 has a top surface 111 and a bottom surface 112. The external force is arranged to apply on the top surface 111 of the actuation button 11. Each of the actuation buttons 11 further comprises a pivot shaft support 113, an energy collecting module presser 115 and a detection control presser 114 respectively, preferably integrally, formed at the bottom surface 112 of the actuation button 11.

The pivot shaft support 113 comprises a button pivot shaft 1130 being supported to provide a pivot movement of the actuation button 11. The housing 12 has an inner side surface 112 and a pivot shaft portion 123 defined thereat, wherein the pivot shaft portion 123 has a pivot shaft slot 1230, wherein the button pivot shaft 1130 is engaged with the pivot shaft slot 1230 to pivotally connect the actuation button 11 with the housing 12. Therefore, in response to the external force, each of the actuation buttons 11 can be driven to pivotally move in an up-and-down reciprocating movement.

Preferably, each of the support shaft slots 1230 and each of the pivot shaft portions 123 is formed at one side of the housing 12, and each of the corresponding button pivot shafts 1130 is formed at one side of the bottom side 112 of the actuation button 11, so as to pivotally couple each of the actuation buttons 11 to the housing 12.

In response to the reciprocating movement of each of the actuation buttons 11 by the external force, the detection control presser 114 is configured to press at the corresponding detection control 40 in order to trigger the corresponding detection control 40. At the same time, the energy collecting module presser 115 is configured to press on the power generation module 50, such that the power generation module 50 is actuated to convert mechanical energy of the external force into electrical energy.

It is worth mentioning that the housing 12 further has a mounting hole 120, wherein the passive rebound switch of the present invention is adapted to couple to a standard junction box installed in the wall surface by fastening a screw to the mounting hole 120. Alternatively, the housing 12 can be directly affixed on the mounting surface, such as by using double-sided tape. In other words, the mounting configuration of the passive rebound switch of the present invention can be the same as that of the conventional standard switch.

It is worth mentioning that, in the preferred embodiment, the power generation module 50 further comprises an auxiliary contact terminal 59, wherein the energy collecting module presser 115 of each of the actuation buttons 11 is configured to press on the auxiliary contact terminal 59 of the power generation module 50 to convert mechanical energy into electrical energy. Preferably, the auxiliary contact terminal 59 is made of soft rubber or covered by soft rubber that is capable of protecting the power generation module 50, in order to provide a water sealing or waterproof ability, so as to prevent any liquid such as water from entering into an interior of the power generation device 50 without affecting the movement of the power generation device 50. Preferably, a contacting protrusion point 590 is defined at a bottom side of the auxiliary contact terminal 59, wherein the contacting protrusion point 590 is driven by the energy collecting module presser 115 while the power generation module 50 is actuated in response to the contacting protrusion point 590.

It is worth mentioning that, in the preferred embodiment, each of the detection controls 40, which is embodied as a detection switch, comprises a buffering element 39 serving as a bumper, wherein the buffering element 39 is located between the detection control 40 and the detection control presser 114. In other words, the detection control presser 114 of each of the actuation buttons 11 is configured to press on the buffering element 39, wherein the buffering element 39 is driven to move to trigger the detection control 40. Preferably, the buffering element 39 is made of soft rubber material as an integrated element. On one hand, when one of the actuation buttons 11 is moved or pressed, the other adjacent actuation button 11 is stationary supported by its corresponding buffering element 39 at the idle position when no external is applied. As a result, only the actuation button 11 being pressed will be moved while the rest of the actuation buttons 11 will remain stationary. On the other hand, the buffering element 39 is made an elastic material to provide a buffering function, wherein when the detection control presser 114 of the actuation button 11 is driven to press on the buffering element 39 to electrify an I/O port, the buffering element 39 provides the elastic buffering force for protecting the detecting switch 40 from being damaged by an excessive pressure of the actuation button 11.

Figure 3:
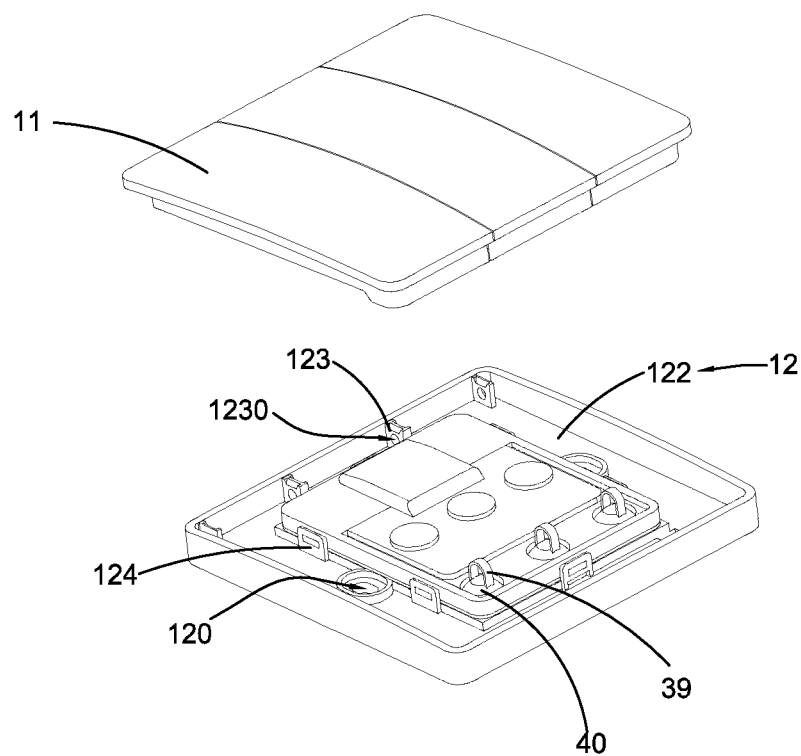
FIG. 3 is an exploded perspective view of the passive rebound switch according to the above preferred embodiment of the present invention, illustrating the actuation buttons being opened.
Figure 4:
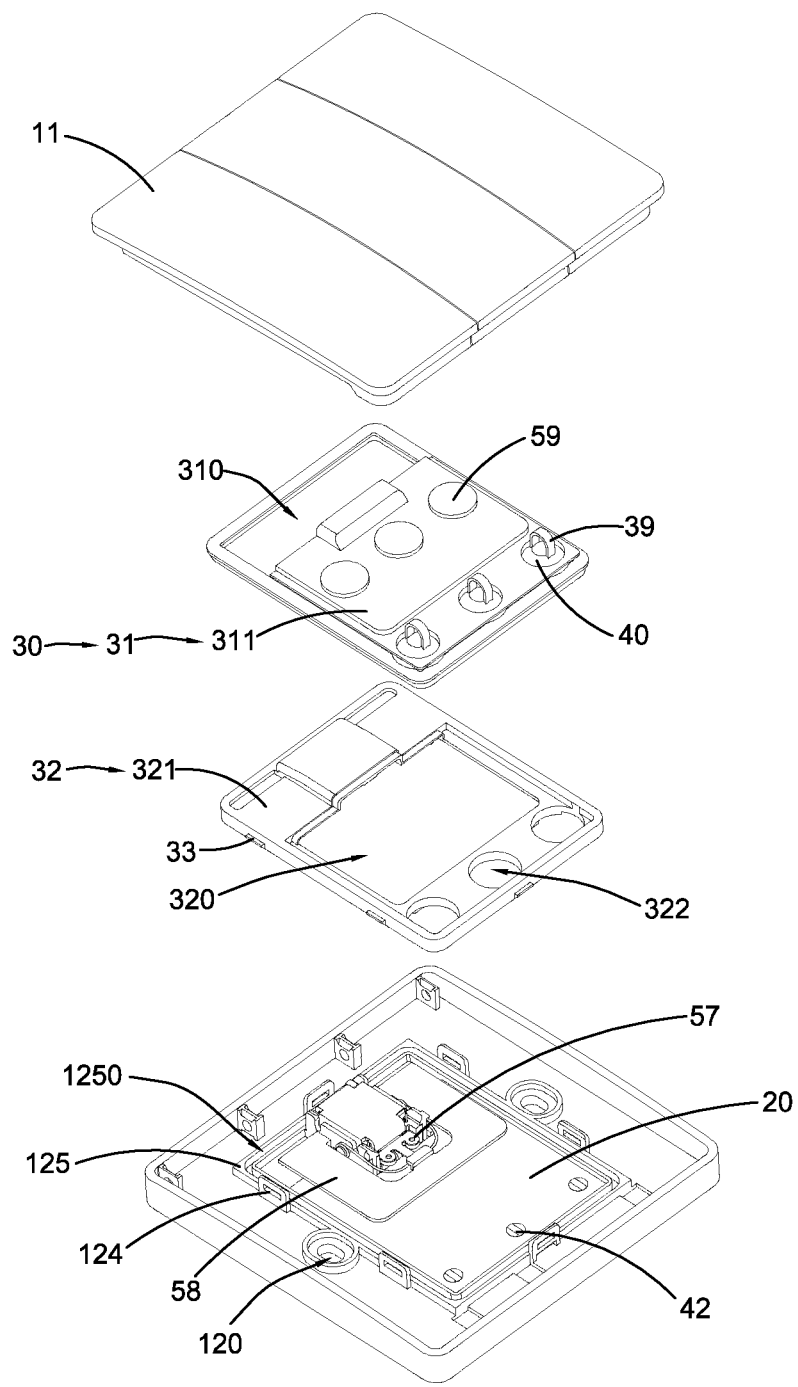
FIG. 4 is a partially exploded perspective view of the passive rebound switch according to the above preferred embodiment of the present invention.
Figure 5:
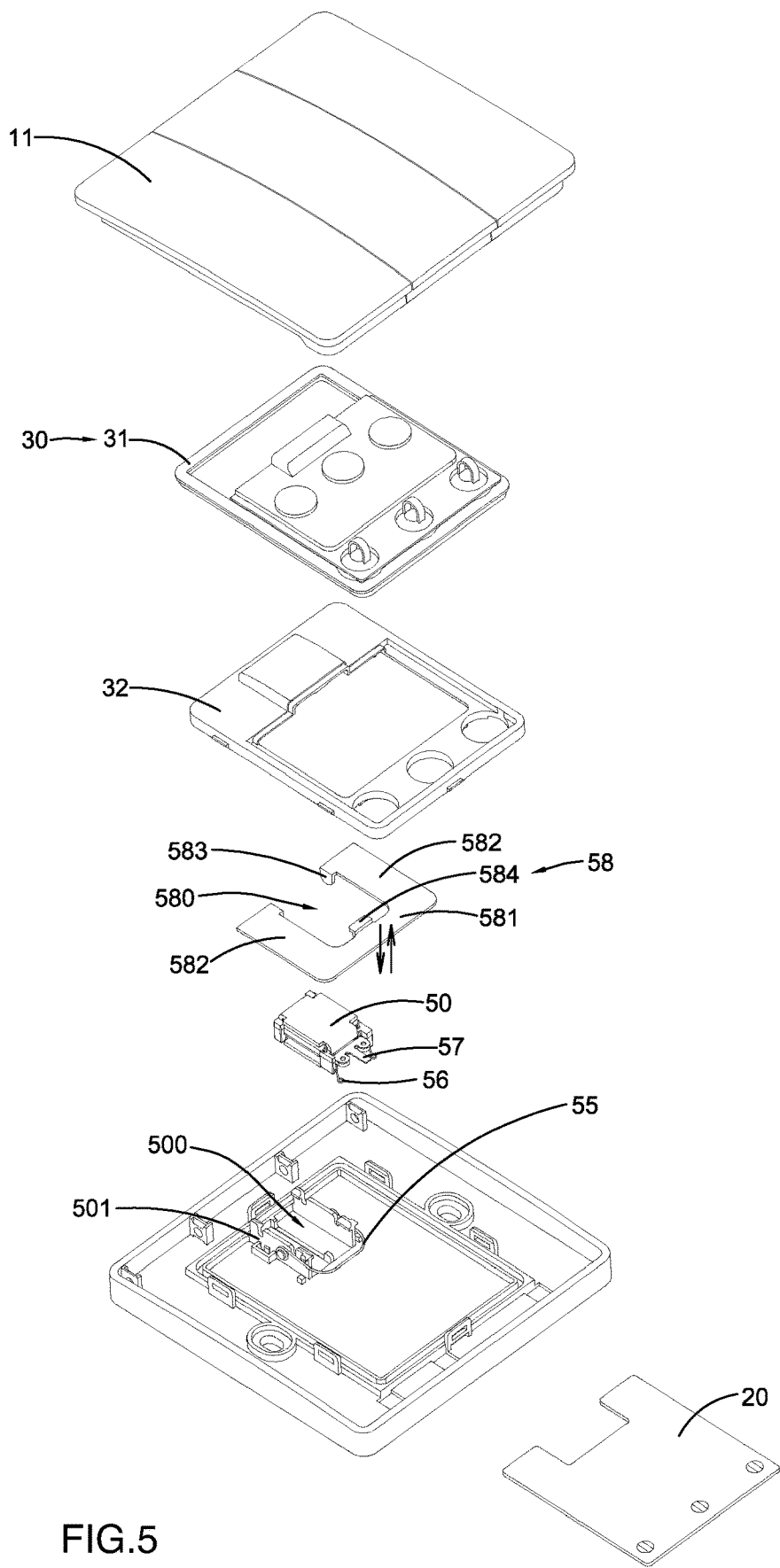
FIG. 5 is an exploded perspective view of the passive rebound switch according to the above preferred embodiment of the present invention.

FIGS. 3 to 5 illustrate the structural configuration of the passive rebound switch of the present invention in detail.

The detecting control 40 is configured to detect the corresponding actuation button 11 between the idle position and the actuated position, wherein at the actuated position, the actuation button 11 is actuated or pressed. Furthermore, the detecting control 40 comprises a conductive contact terminal 41 and an I/O port 42. The conductive contact terminal 41 is located at a bottom of the buffering element 39. The I/O port 42 is an I/O terminal of an encoder and is operatively connected to the signal transmission module 20. When the I/O port 42 is in contact with the conductive contact terminal 41, the I/O port 42 is electrified, wherein the encoder is configured to generate a preset code according to a change in the level of the I/O port 42. Therefore, the encoder is configured to transmit the preset code to the signal transmission module 20, such that the signal transmission module 20 is configured to wirelessly transmit the preset code to a receiving end. It is worth mentioning that the signal transmission module 20 comprises a signal transmission circuit receiving the preset code from the encoder and wirelessly transmitting the preset code to the receiving end, such as an electrical appliance to be controlled. In other words, the signal transmission module 20 is configured to transmit a control signal with the preset code for controlling the electrical appliance.

Figure 6:
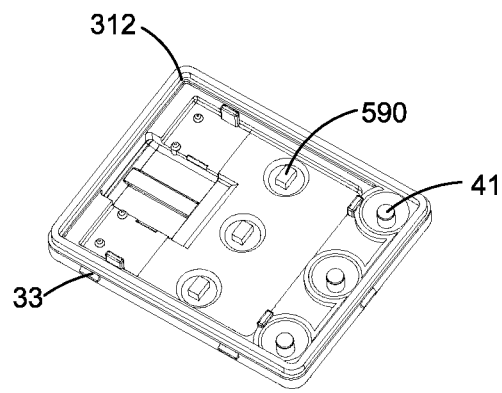
FIG. 6 is a bottom perspective view of an interior casing assembly of the passive rebound switch according to the above preferred embodiment of the present invention.
Figure 7:
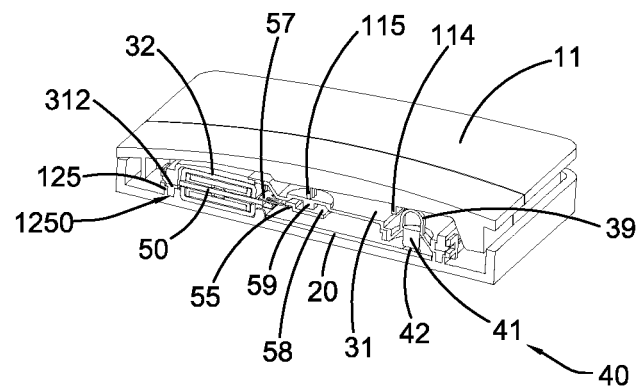
FIG. 7 is a sectional view of the passive rebound switch according to the above preferred embodiment of the present invention.
Figure 8:
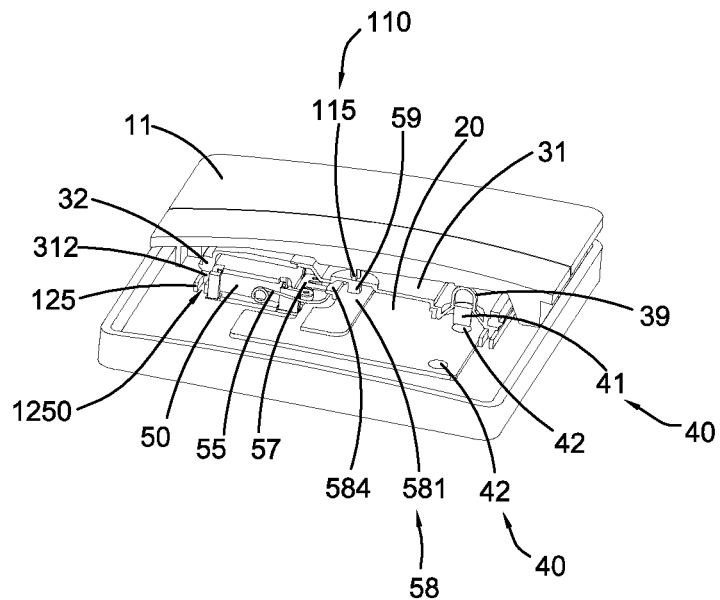
FIG. 8 is a partially sectional view of the passive rebound switch according to the above preferred embodiment of the present invention.
Figure 9:
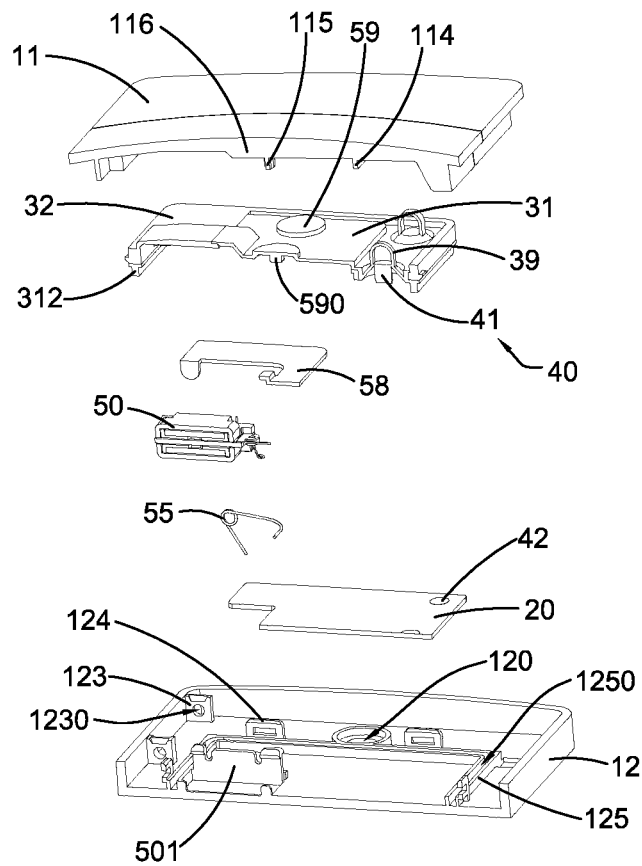
FIG. 9 is an exploded sectional view of the passive rebound switch according to the above preferred embodiment of the present invention.

FIGS. 4 to 6 illustrates the waterproof ability of the passive rebound switch of the present invention.

Accordingly, the passive rebound switch further comprises an interior casing assembly 30 which serve as a waterproof cover of the passive rebound switch, wherein a waterproof chamber is formed between the interior casing assembly 30 and the housing 12 to seal and receive the power generation module 50 and the signal transmission module 20 in the waterproof chamber.

Particularly, the interior casing assembly 30 comprises a first inner casing 31 and a second inner casing 32 coupled with each other, wherein the buffering element 39 and the auxiliary contact terminal 59 are disposed at the first inner casing 31. The first inner casing 31 is preferably made of a soft rubber material, and the second inner casing 32 is made of plastic material. Preferably, the buffering element 39 can be integrally formed with the first inner casing 31. It should be understood that the buffering element 39 and the first inner casing 31 are two individual components and are coupled with each other. Likewise, the auxiliary contact terminal 59 can be integrally formed with the first inner casing 31. It should be understood that the auxiliary contact terminal 59 and the first inner casing 31 are two individual components and are coupled with each other.

It should be understood that the first inner casing 31 and the second inner casing 32 can be made of combination of soft rubber material and plastic material. In other words, a portion of the auxiliary contact terminal 59 can be made of soft rubber material to be formed with the first inner casing 31 and the second inner casing 32, such that when the auxiliary contact terminal 59 is pressed to drive and actuate the power generation module 50 between the interior casing assembly 30 and the housing 12.

The interior casing assembly 30 further comprises an inner casing fastener 33. Preferably, the inner casing fastener 33 is formed at a sidewall of the second inner casing 32, wherein the housing 12 further comprises a housing fastener 124 detachably coupled with the inner casing fastener 33. Preferably, the housing fastener 124 and the inner casing fastener 33 are detachably coupled with each other by means of snap-fit connection manner. In other words, the interior casing assembly 30 can be detached from the housing 12 via the detachable connection between the housing fastener 124 and the inner casing fastener 33.

Particularly, the first inner casing 31 further has a first waterproof portion 311 and has a first inner casing hole 310. The second inner casing 32 further has a second waterproof portion 321 and a second inner casing hole 320. The shapes of the first inner casing hole 310 and the second waterproof portion 321 are matched, and the shapes of the first waterproof portion 311 and the second inner casing hole 320 are matched. Preferably, the buffering element 39 and the auxiliary contact terminal 59 are formed at the first waterproof portion 311, wherein the first waterproof portion 311 is configured to be driven to move by the actuation button 11. Preferably, the second waterproof portion 321 is configured for supporting the first inner casing 31. The first waterproof portion 311 is tightly sealed with the second inner casing hole 320, and the second waterproof portion 321 is tightly sealed with the first inner casing hole 310, such that a waterproof and sealing chamber is formed between the first inner casing 31 and the second inner casing 32 that the volume of the waterproof and sealing chamber can be adjustable.

The second inner casing 32 further has a detection control hole 322 formed at the second waterproof portion 321 of the second inner casing 32, wherein the detection control 40 is accommodated in the detection control hole 322. In the preferred embodiment, the first waterproof portion 311 of the first inner casing 31 is embedded in the second waterproof portion 321, such that the detecting control 40 is tightly sealed at the detection control hole 322. Therefore, any liquid such as water cannot enter into the waterproof chamber through the detection control hole 322 to damage the electronic components such as the power generation device 50 and the signal transmission module 20 in the waterproof chamber.

Furthermore, the interior casing assembly 30 further comprises a waterproof wall 312 formed at a bottom side thereof, wherein the housing 12 further has a casing waterproof portion 125 having a shape matching the waterproof wall 312. A waterproof groove 1250 is formed by the casing waterproof portion 125. The waterproof wall 312 of the interior casing assembly 30 is placed in the waterproof groove 1250 of the housing 12 to form the waterproof chamber between the interior casing assembly 30 and the housing 12. The electronic components such as the power generation module 50 and the signal transmission module 20 are enclosed and sealed in the waterproof chamber for preventing any liquid such as water entering thereinto so as to provide the waterproofing feature. Preferably, the casing waterproof portion 125 is a double-layered annular side wall and is protruded from an inner side surface 122 of the housing 12 to form the waterproof groove 1250. Preferably, the waterproof wall 312 is disposed at the bottom of the first inner casing 31 of the interior casing assembly 30. Preferably, the waterproof wall 312 is made of a silicone material to enhance the sealing ability of the waterproof wall 312 and the waterproof groove 1250.

Preferably, the auxiliary contact terminal 59 has a disc-shape and is integrally formed on the upper surface of the interior casing assembly 30. Preferably, the auxiliary contact terminal 59 is formed at the first waterproof portion 311 of the first inner casing 31 of the interior casing assembly 30.

It is worth mentioning that the inner casing fastener 33 of the interior casing assembly 30 and the housing fastener 124 of the housing 12 are detachably coupled with each other via the snap-fitted manner. Preferably, the housing fastener 124 is formed at a periphery of the housing waterproof portion 125, wherein the waterproof wall 312 is engaged with the waterproof groove 1250 of the housing 12. Therefore, through the engagement between the inner casing fastener 33 and the housing fastener 124, the waterproof wall 312 can be secured and retained to enhance to waterproof ability.

It can be understood that the waterproof wall 312 can be disposed at the housing 12, and the waterproof groove 1250 can be formed at the interior casing assembly 30, wherein it should not be limited in the present invention.

It is worth mentioning that the conductive contact terminal 41 of the detection control 40 of the present invention is in contact with the I/O port 42 disposed on the signal transmission module 20 to control its on-and-off manner. In other embodiments, The detection control 40 can also be implemented as a micro switch.

As shown in FIGS. 4 to 9, the power generation module 50 comprises a power generation module side panel 501 disposed on an inner side of the housing waterproof portion 125 of the housing 12, to forms a power generation module retention slot 500 for generating electricity. The power generation module 50 is retained in the power generation module retention slot 500.

The energy collecting module 58 serves a supporting frame retained between power generation module 50 and the interior casing assembly 30. A paddling member 57 is coupled to the power generation module 50, wherein the paddling element 57 is driven to move by the energy collecting module 58. When the external force is applied to the actuation button 11, the external force is transmitted to the auxiliary contact terminal 59 through the energy collecting module presser 115. Then, the auxiliary contact terminal 59 is actuated to press against the energy collecting module 58, wherein the energy collecting module 58 is pressed against the paddling member 57 to activate the power generation module 50 for converting the mechanical energy into the electrical energy. The power generation module 50 is connected to a power generation module terminal 56, and is electrically connected to the signal transmission module 20 through the power generation module terminal 56 to supply the electrical energy and the like to the electronic components such as the signal transmission module 20. It will be understood that the specific structure of the power generation module 50 of the present invention and its alternatives and power generation principle have been disclosed in detail in other patent documents by the inventor of the present invention, which can be applied to the power generation module 50 of the present invention.

The power generation module 50 further comprises a restoring element 55, such as a torsion spring, coupled at the housing 12 to move the actuation button 11 back from the actuated position to the idle position. Particularly, the restoring element 55 is coupled to the power generation module side panel 501 to reset the movement of the paddling member 57 via an elastic force of the restoring element 55 so as to restore the paddling element 57 back to its original position. When the paddling member 57 is reset, the auxiliary contact terminal 59, the interior casing assembly 30, and the actuation button 11 are driven to reset to their original positions via the paddling member 57, such that the actuation button 11 is rebounded and returned back to its original position.

Furthermore, the energy collecting module 58, generally having a U-shaped configuration, further comprises a main pressing portion 581, two side wing portions 582, a forcing arm 583, a pressing protrusion portion 584, and an arm slot 580. The two side wing portions 582 are integrally and perpendicularly extended from two ends of the main pressing portion 581 to form a U-shaped supporting member. In other words, one end of each of the side wing portions 582 is integrally extended from the main pressing portion 581 and another opposed end of each of the side wing portions 582 is bent downwardly to form the forcing arm 583. In other words, a portion of each of the side wing portions 582 is bent to integrally form with the forcing arm 583, wherein the forcing arm 583 is perpendicularly extended from the side wing portion 582. The pressing protrusion portion 584 is defined at an inner mid-portion of the main pressing portion 581, wherein the pressing protrusion portion 584 is integrally protruded from an inner edge of the main pressing portion 581 for actuating the power generation module. The arm slot 580 is formed within the main pressing portion 581 and the two side wing portions 582, such that the inner edges of the main pressing portion 581 and the two side wing portions 582 form a boundary of the arm slot 580. The power generation module 50 is disposed in the arm slot 580. When the external force is applied to the actuation button 11, the auxiliary contact terminal 59 is pressed by the energy collecting module presser 115. Then, the auxiliary contact terminal 59 is arranged to press against the main pressing portion 581 of the energy collecting module 58. The main pressing portion 581 is pivotally moved with respect to the forcing arm 583 as a pivot point. Then, the pressing protrusion portion 584 is moved by the pivotal movement of the main pressing portion 581 to press against the paddling member 57. Therefore, the power generation module 50 is driven and actuated by the paddling member 57 to convert the mechanical energy into the electrical energy.

It is worth mentioning that the main pressing portion 581 of the energy collecting module 58 preferably has a flat configuration, such as a flat plate, wherein it can be selectively adjusted or modified its size and shape according to actual needs. More than one actuation button 11 can be incorporated with the energy collecting module presser 115 to individually or concurrently press against the corresponding auxiliary contact terminals 59. Furthermore, each of the auxiliary contact terminals 59 can press the main pressing portion 581 of the energy collecting module 58 separately or simultaneously in order to press the paddling member 57 by the main pressing portion 581 of the energy collecting module 58 so as to actuate the power generation module 50 for generating the electrical energy. In other words, the passive rebound switch of the present invention requires one single power generating assembly for supplying the electrical energy to different actuation buttons 11 while being cost effective. At the same time, since only one single power generating assembly is utilized, the size and cost of the passive rebound switch of the present invention can be highly reduced. Thus, when using a stronger power generating assembly, the power generation capacity will be increased while being cost effective to incorporate with different power consumption requirement of the circuits.

Furthermore, the signal transmission module 20 comprises an energy integrated circuit configured to combine two consequent electrical energies together in response to the actuation button 11 being pressed and restored. In other words, the first electrical energy is generated when the actuation button 11 is pressed and the second electrical energy is generated when the actuation button 11 is restored back to its original position. Therefore, the power generation module 50 can be fully utilized to increase the overall power output, such that a command circuit of the signal transmission module 20 can effectively transmit the wireless signal at a higher radio frequency power and the control thereof is more reliable. In other words, the signal transmission module 20 of the present invention can serve as an energy synthesizer, such that the present invention is able to generate a larger power output comparing with the conventional expensive communication integrated circuit with low-power efficiency. The use of general inexpensive, high-power communication circuits, including single triode of wireless communication circuits, can be driven normally, so as to reduce the manufacturing costs and operating costs.

Furthermore, the arrangement of the actuation buttons 11 of the present invention can be formed with a cloth covered key 10. The waterproof chamber between the interior casing assembly 30 and the housing 12 is defined within a housing cavity within the cloth covered key 10 and the housing 12. When the actuation buttons 11 of the cloth covered key 10 are actuated separately or simultaneously, the interior casing assembly 30 can be actuated or pressed in the housing cavity formed between the cloth covered key 10 and the housing 12. The interior casing assembly 30 is arranged to press against the energy collecting module 58 housed in the waterproof chamber formed between the interior casing assembly 30 and the housing 12. The energy collecting module 58 is arranged to press the paddling member 57, such that the paddling element 57 is arranged to drive and actuate the power generation module 50. The power generation module 50 is arranged to convert the mechanical energy into the electrical energy in order to provide the electrical energy to the signal transmission module 20. The restoring element 55 is arranged to reset the power generation module 50 and the paddling member 57 back to their original positions. The power generation module 50 is arranged to convert the mechanical energy into the electrical energy again in response to the resetting of the power generation module 50. The resetting of the paddling member 57 is arranged to reset the energy collecting module 58 and the interior casing assembly 30 back to their original positions, such that the actuated actuation button 11 of the cloth covered key 10 is rebound and reset.

The energy collecting module presser 115 and the detection control presser 114 of the actuation button 11 can be defined as a button pressing portion 110 of the actuation button 11. The actuation button 11 further comprises a pressing extension rib 116 formed at the button pressing portion 110 at the bottom surface of the actuation button 11 for enhancing a strength of the actuation button 11. According to the preferred embodiment, the energy collecting module presser 115 and the detection control presser 114 are protruded, preferably integrally extended, from the pressing extension rib 116.

According to the preferred embodiment as an example, the passive rebound switch is constructed to have one power generation module 50 and three actuation buttons 11, wherein the three actuation buttons 11 form the cloth covered key 10. The three actuation buttons 11 provide three corresponding button pressing portions 110 respectively. Three button pressing portions 110 correspond to three buffer elements 39, three auxiliary contact terminals 59, and three detecting controls 40 respectively in order to ensure the interior casing assembly 30 able to be actuated by any one of the actuation buttons 11 of the cloth covered key 10 to actuate the power generation module 50 and to activate the signal transmission module 20. The detection control 40 is configured to pre-electrify the I/O port of the encoder of the signal transmission module 20, i.e. the signal transmission module 20 is pre-activated by the detection control 40, before the electrical energy is generated by the power generation module 50, so as to communicatively connect with the encoding control command. The signal transmission module 20 is configured for transmitting at least one control signal after the signal transmission module 20 is powered. Since the multiple buttons will not provide a relatively large affect for the circuit, the requirements thereof are not high. In addition, the manufacturing cost of the detecting control 40 is relatively low, and only one power generation module 50 is required. Unlike the conventional switch, the number of the detection controls 40 and one or more of the actuation buttons 11 can be selectively matched according to the passive rebound switch of the present invention. Therefore, the cost of the present invention will not be increased due to the number of the actuation buttons 11 and the detection controls 40.

Figure 12:
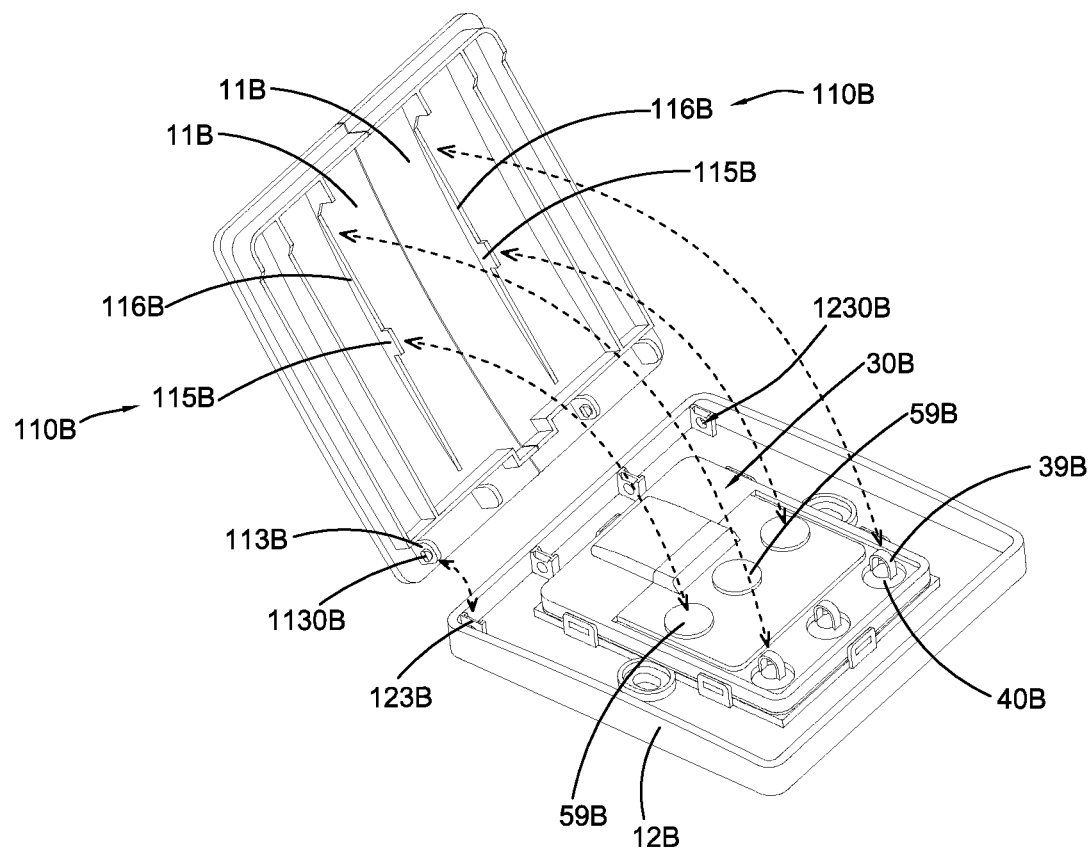
FIG. 12 illustrates a second alternative mode of the passive rebound switch according to the above preferred embodiment of the present invention.
Figure 13:
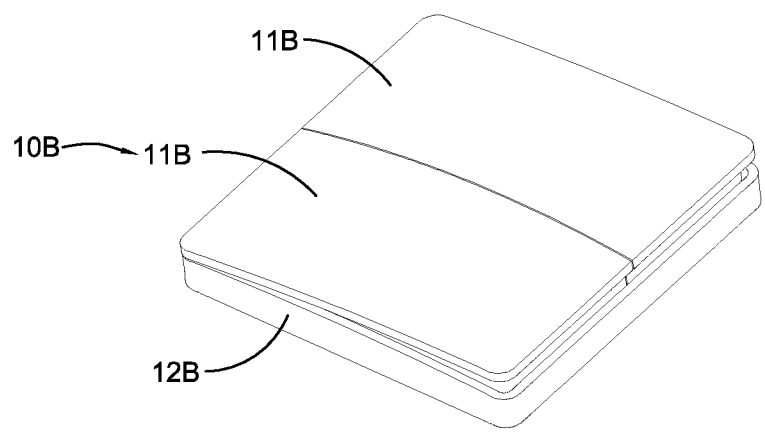
FIG. 13 is a perspective of the passive rebound switch according to the second alternative mode of the above preferred embodiment of the present invention.
Figure 14:
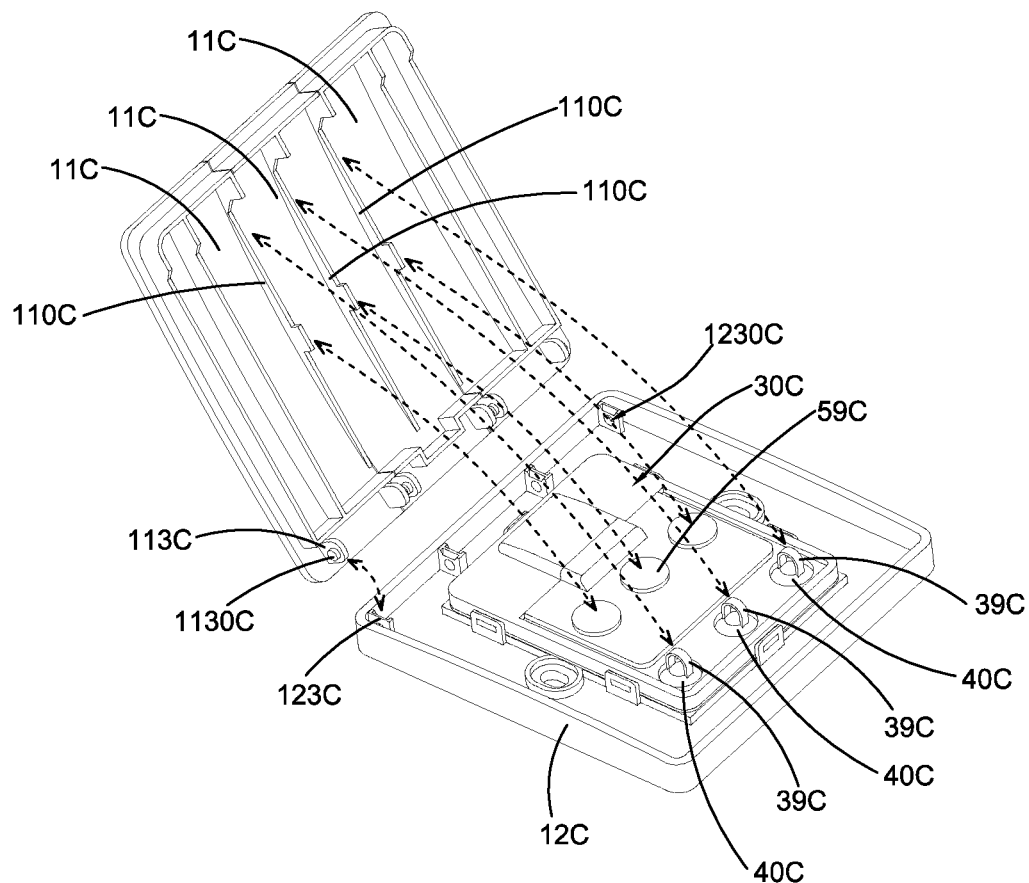
FIG. 14 illustrates a third alternative mode of the passive rebound switch according to the above preferred embodiment of the present invention.
Figure 15:
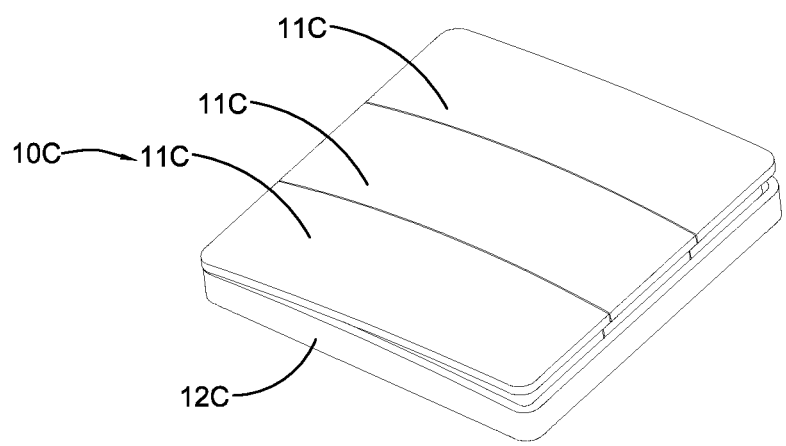
FIG. 15 is a perspective of the passive rebound switch according to the third alternative mode of the above preferred embodiment of the present invention.

The passive rebound switch of the present invention is able to selectively change the number of button for the cloth covered key 10 in order to enhance the practical use of the switch. Moreover, the actuation buttons 11 of the cloth covered key 10 can be selectively interchanged to fit the actual need of the switch. For example, the passive rebound switch provides a single button configuration as shown in FIGS. 10 to 11, the passive rebound switch provides a double button configuration as shown in FIGS. 12 to 13, and the passive rebound switch provides a triple button configuration as shown in FIGS. 14 to 15.

In other words, the passive rebound switch provides an expandable ability to selectively adjust the number of buttons, such as increasing or reducing the number of buttons. The user is able to configure a desired number of the actuation buttons 11 of the cloth covered key 10 as needed to achieve the required number of connection channels, so as to improve the practical use and the aesthetics appearance of the switch comparing to the conventional switch. The cloth covered key 10 of the present invention can also serve as a replaceable button cover. In order to dissemble each of the actuation buttons 11, the button pivot shaft 1130 of the actuation button 11 of the cloth covered key 10 can be disengaged with the pivot shaft slot 1230 of the housing 12, such that the actuation buttons 11 can be detached and rearranged their positions. Furthermore, since the cloth covered key 10 can be implemented as a replaceable key cover, the user is able to adjust and/or replace each of the actuation buttons 11. When the passive rebound switch of the present invention is installed on the wall surface, the passive rebound switch provides an aesthetic and decorative appearance for the wall with different colors and styles according to the different ages and user preferences as a part of the interior design.

Figure 10:
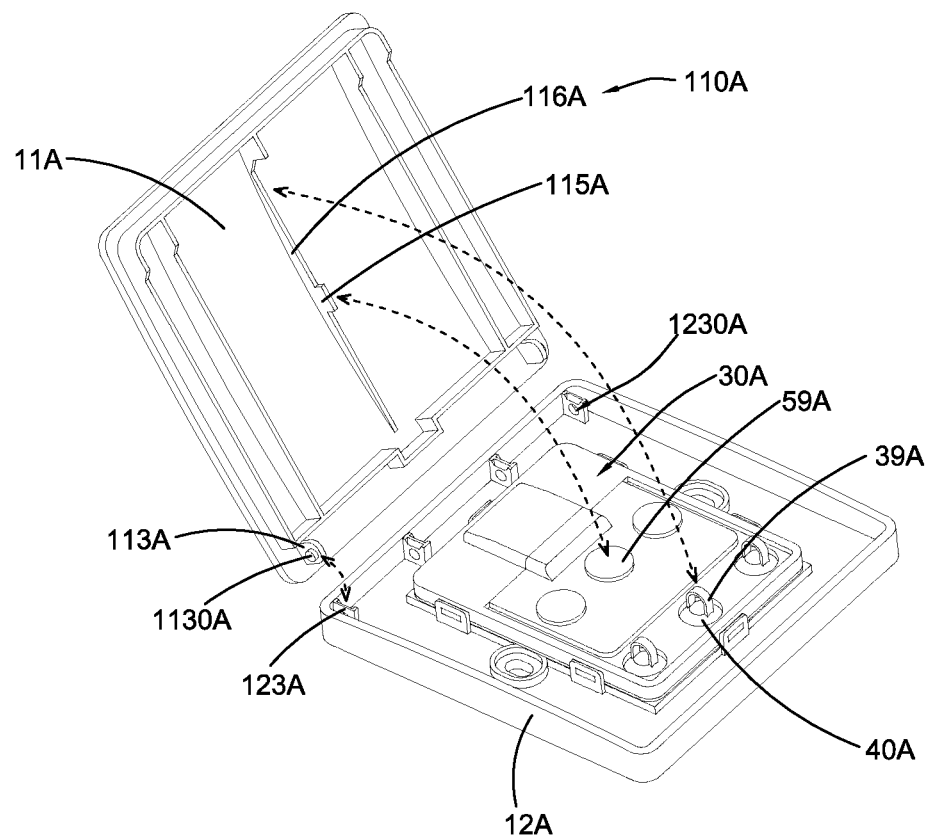
FIG. 10 illustrates a first alternative mode of the passive rebound switch according to the above preferred embodiment of the present invention.
Figure 11:
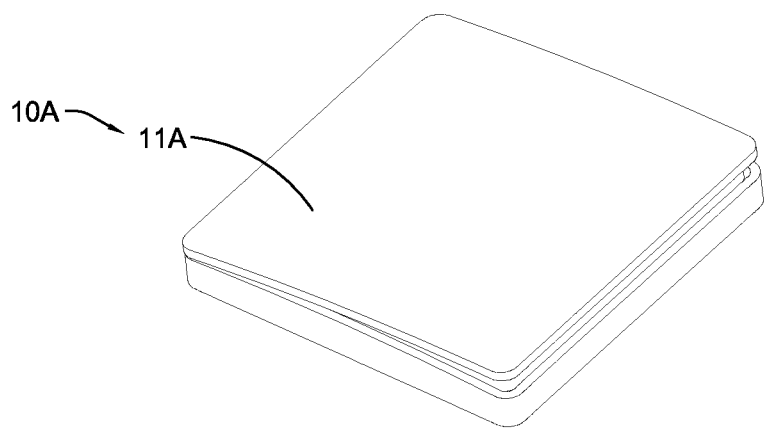
FIG. 11 is a perspective of the passive rebound switch according to the first alternative mode of the above preferred embodiment of the present invention.

FIGS. 10 and 11 illustrate a first alternative mode of the passive rebound switch, which has the same structural configuration of the above preferred embodiment, except the cloth covered key 10A being different from the cloth covered key 10 of the preferred embodiment.

It is worth mentioning that the energy collecting module 58 is able to collect the pressing force of any one of the actuation buttons 11 and to transmit it to the power generation module 50, such that the power generation module 50 is able to convert the mechanical energy of the external force collected by the energy collecting module 58 into the electrical energy.

Particularly, the passive rebound switch as shown in FIGS. 10 to 11 is implemented as a single button passive rebound switch. In other words, the cloth covered key 10A is constructed to have one actuation button 11A, wherein the button pressing portion 110A is provided at the inner side of the actuation button 11A. The button pressing portion 110A is configured to have the energy collecting module presser 115A and the pressing extension rib 116A. The energy collecting module presser 115A is protruded at a middle of the pressing extension rib 116A. When the external force is applied on the actuation button 11A, the energy collecting module is pressed by the auxiliary contact terminal 59A of the interior casing assembly 30A. The energy collecting module is configured to actuate the power generation module (the energy collecting module and the power generation module are not shown in FIGS. 10 and 11). Preferably, the button pressing portion 110A is configured to have an arc shape that a height of the button pressing portion 110A is gradually reduced from the mid-portion toward two end portions. The buffering element 39A is protruded from the interior casing assembly 30A, wherein when the button pressing portion 110A is driven to move, not only the energy collecting module presser 115A is driven to press the auxiliary contact terminal 59A to cause the power generation module for generating the electrical energy, but also the end portion of the pressing extension rib 116A is driven to press the buffing element 39A so as to trigger the detection control 40A.

Two button pivot shafts 1130A are formed at an inner peripheral edge of the cloth covered key 10A. Correspondingly, two pivot shaft slots 1230A are formed at an inner peripheral edge of the housing 12A, wherein the button pivot shafts 1130A are rotatably engaged with the pivot shaft slots 1230A respectively to pivotally couple the cloth covered key 10A with the housing 12A. The button pivot shafts 1130A can be disengaged with the pivot shaft slots 1230A respectively to detach the cloth covered key 10A from the housing 12A.

FIGS. 12 and 13 illustrates a second alternative mode of the passive rebound switch, which has the same structural configuration of the above preferred embodiment, except the cloth covered key 10B being different from the cloth covered key 10 of the preferred embodiment.

Particularly, the passive rebound switch as shown in FIGS. 12 to 13 is implemented as a double button passive rebound switch. In other words, the cloth covered key 10B is constructed to have two actuation buttons 11B, wherein the button pressing portion 110B is provided at the inner side of each of the actuation buttons 11B. The button pressing portion 110B is configured to have the energy collecting module presser 115B and the pressing extension rib 116B. The energy collecting module presser 115B is protruded at a middle of the pressing extension rib 116B. When the external force is applied on one of the actuation buttons 11B, the energy collecting module is pressed by the auxiliary contact terminal 59B of the interior casing assembly 30B. The energy collecting module is configured to actuate the power generation module (the energy collecting module and the power generation module are not shown in FIGS. 12 and 13). Preferably, the button pressing portion 110B is configured to have an arc shape that a height of the button pressing portion 110B is gradually reduced from the mid-portion toward two end portions. The buffering element 39B is protruded from the interior casing assembly 30B, wherein when the button pressing portion 110B is driven to move, not only the energy collecting module presser 115B is driven to press the auxiliary contact terminal 59B to cause the power generation module for generating the electrical energy, but also the end portion of the pressing extension rib 116B is driven to press the buffing element 39B so as to trigger the detection control 40B.

Two button pivot shafts 1130B are formed at an inner peripheral edge of each of the actuation buttons 11B of the cloth covered key 10B. Correspondingly, two or more pivot shaft slots 1230B are formed at an inner peripheral edge of the housing 12B, wherein the button pivot shafts 1130B are rotatably engaged with the pivot shaft slots 1230B respectively to pivotally couple each of the actuation button 11B of the cloth covered key 10B with the housing 12B. The button pivot shafts 1130B can be disengaged with the pivot shaft slots 1230B respectively to detach each of the actuation button 11B of the cloth covered key 10B from the housing 12B.

FIGS. 14 and 15 illustrates a third alternative mode of the passive rebound switch, which has the same structural configuration of the above preferred embodiment, except the cloth covered key 10C being different from the cloth covered key 10 of the preferred embodiment.

Particularly, the passive rebound switch as shown in FIGS. 14 to 15 is implemented as a triple button passive rebound switch. In other words, the cloth covered key 10C is constructed to have three actuation buttons 11C, wherein the button pressing portion 110C is provided at the inner side of each of the actuation buttons 11C. The button pressing portion 110C is configured to have the energy collecting module presser 115C and the pressing extension rib 116C. The energy collecting module presser 115C is protruded at a middle of the pressing extension rib 116C. When the external force is applied on one of the actuation buttons 11C, the energy collecting module is pressed by the auxiliary contact terminal 59C of the interior casing assembly 30C. The energy collecting module is configured to actuate the power generation module (the energy collecting module and the power generation module are not shown in FIGS. 14 and 15). Preferably, the button pressing portion 110C is configured to have an arc shape that a height of the button pressing portion 110C is gradually reduced from the mid-portion toward two end portions. The buffering element 39C is protruded from the interior casing assembly 30C, wherein when the button pressing portion 110C is driven to move, not only the energy collecting module presser 115C is driven to press the auxiliary contact terminal 59C to cause the power generation module for generating the electrical energy, but also the end portion of the pressing extension rib 116C is driven to press the buffing element 39C so as to trigger the detection control 40C.

Two button pivot shafts 1130C are formed at an inner peripheral edge of each of the actuation buttons 11B of the cloth covered key 10C. Correspondingly, two or more pivot shaft slots 1230C are formed at an inner peripheral edge of the housing 12C, wherein the button pivot shafts 1130C are rotatably engaged with the pivot shaft slots 1230C respectively to pivotally couple each of the actuation button 11C of the cloth covered key 10C with the housing 12C. The button pivot shafts 1130C can be disengaged with the pivot shaft slots 1230C respectively to detach each of the actuation button 11C of the cloth covered key 10C from the housing 12C.

It can be understood that according to the alternative modes, the cloth covered key 10 can be further modified to have more than three actuation buttons 11 according to actual needs of the user, wherein each of the actuation buttons 11 can be selectively rearranged and disassembled. It is also able to individually or concurrently operate different numbers of changeable buttons to actuate the single power generation module 50 for self-supplying electrical energy, at the same time, to trigger the detection control 40. The number of the detection control 40 can match with the number of the actuation button 11. It should not be limited in the present invention.

It is worth mentioning that the embodiments of the present invention mainly exemplify the three button configuration for the passive rebound switch, wherein the number of buttons should not limited thereto. In other words, having the same structural and operational configuration as disclosed in the present invention, the passive rebound switch is able to fit different actual need by increasing the numbers of buttons and detection controls.

According to the present invention, the present invention further provides a method for self-powering the passive rebound switch, which comprises the following steps.

(A) Apply an external force on at least one of the actuation buttons.

(B) Press at least one detection control by the actuation button.

(C) Press at least one energy collecting module by the actuation button.

(D) Activate the power generation module by the energy collecting module.

(E) Generate a first electrical energy by the power generation module.

(F) Electrify at least one signal transmission module to generate a first control signal. Preferably, the signal transmission module is pre-activated by the first electrical energy.

(G) Reset the actuation button to move the actuation button back to its original position by a resetting device generating a rebounding force which is opposite to the external force.

(H) Generate a second electrical energy by the power generation module in response to the rebounding force of the resetting device.

(I) Electrify the signal transmission module to generate a second control signal. Preferably, the signal transmission module generates the control signal when the signal transmission module is powered by the second electrical energy.

(J) Reset the energy collecting module and the power generation module back to their original position.

Accordingly, the energy collecting module, the detection control, the signal transmission module, the resetting device and the power generation module are sealed and received in the waterproof chamber of the passive rebound switch.

In one embodiment, the resetting device is implemented as a resetting element 55 which is a spring.

power generation module 50, an energy collecting module 58, a signal transmission module 20, a cover assembly 10, a plurality of detection controls 40 (such as three), and a housing 12, auxiliary contact terminal 59, interior casing assembly 30, conductive contact terminal 41, I/O port 42, detection control presser 114, energy collecting module presser 115, pressing extension rib 116, power generation module side panel 501, restoring element 55, button pivot shaft 1130, pivot shaft portion 123, pivot shaft slot 1230, One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A passive rebound switch; comprising:
   a housing;
   at least an actuation button detachably and pivotally coupled at said housing to define a receiving chamber between said actuation button and said housing, wherein said actuation button is actuated, in response to an external force applied thereon, in a reciprocated rebounding movement between an idle position and an actuated position;
   an energy generation module being actuated and triggered by said reciprocated rebounding movement of said actuation button for converting a mechanical energy of the external force into an electrical energy;
   at least an energy collecting module disposed between said actuation button and said power generation module;
   at least a detection control received in said receiving chamber to detect said actuation button between said idle position and said actuated position, and being actuated by said reciprocated rebounding movement of said actuation button at the same time when said energy generation module is actuated; and
   a signal transmission module being pre-activated by said detection control before said energy generation module generates the electrical energy, wherein said signal transmission module is configured for transmitting a control signal after said signal transmission module is powered by said energy generation module.

2. The passive rebound switch, as recited in claim 1, wherein said actuation button comprises an energy collecting module presser and a detection control presser spacedly extended from a bottom surface of said actuation button to align with said energy collecting module and said detection control respectively, such that when said actuation button is actuated, said energy collecting module presser and said detection control presser are driven to actuate said energy collecting module and said detection control at the same time.

3. The passive rebound switch, as recited in claim 2, wherein said actuation button further comprises a pressing extension rib formed at said bottom surface of said actuation button, wherein said energy collecting module presser and said detection control presser are integrally and spacedly protruded from said pressing extension rib.

4. The passive rebound switch, as recited in claim 2, wherein said power generation module comprises an auxiliary contact terminal being pressed by said energy collecting module presser of said actuation button in order to actuate said power generation module for converting the mechanical energy into the electrical energy.

5. The passive rebound switch, as recited in claim 4, wherein said detection control comprises a buffering element formed between said detection control and said detection control presser, wherein said buffering element is configured to actuate said detection control when said buffering element is pressed by said detection control presser and is configured to support said actuation button at a stationary manner at said idle position.

6. The passive rebound switch, as recited in claim 5, further comprising an interior casing assembly coupled between said actuation button and said housing to form a waterproof chamber between said interior casing assembly and said housing, wherein said power generation module and said signal transmission module are sealed and received in said waterproof chamber.

7. The passive rebound switch, as recited in claim 6, wherein said interior casing assembly comprises a first inner casing and a second inner casing coupled with each other, wherein said auxiliary contact terminal and said buffering element are formed at said first inner casing.

8. The passive rebound switch, as recited in claim 6, wherein said interior casing assembly comprises a waterproof wall formed at a bottom side thereof, wherein said housing has a waterproof groove engaged with said waterproof wall to form said waterproof chamber between said interior casing assembly and said housing.

9. The passive rebound switch, as recited in claim 7, wherein said first inner casing has a first waterproof portion and has a first inner casing hole, wherein said second inner casing has a second waterproof portion and a second inner casing hole, wherein said first waterproof portion is tightly sealed and enclosed to said second inner casing hole, and said second waterproof portion is tightly sealed and enclosed to said first inner casing hole.

10. The passive rebound switch, as recited in claim 9, wherein said auxiliary contact terminal and said buffering element are formed at said first waterproof portion of said first inner casing.

11. The passive rebound switch, as recited in claim 9, wherein said first inner casing is made of a soft rubber material and said second inner housing is made of plastic material.

12. The passive rebound switch, as recited in claim 5, wherein said detection control further comprises a conductive contact terminal and an I/O port, wherein said I/O port is disposed at said signal transmission module while said conductive contact terminal is disposed at a bottom of said buffering element.

13. The passive rebound switch, as recited in claim 1, further comprising a paddling member coupled to said power generation module, wherein when said actuation button is actuated, said paddling member is pressed by said energy collecting module to activate said power generation module.

14. The passive rebound switch, as recited in claim 1, further comprising a restoring element coupled at said housing to move said actuation button back from said actuated position to said idle position.

15. The passive rebound switch, as recited in claim 13, further comprising a restoring element coupled at said housing to move said actuation button back from said actuated position to said idle position, wherein said restoring element is further coupled to said paddling member to move said paddling member back to its original position, such that said actuation button is moved by padding member to return back to said idle position.

16. The passive rebound switch, as recited in claim 1, wherein said energy collecting module serves as a supporting frame having a U-shaped configured and comprises a main pressing portion and two side wing portions spacedly and perpendicularly extended from two ends of said main pressing portion, wherein said power generation module is disposed between said side wing portion, such that when said actuation button is actuated, said main pressing portion of said energy collecting module is pressed to drive said power generation module.

17. The passive rebound switch, as recited in claim 16, wherein said energy collecting module further comprises a forcing arm, wherein each of said side wing portions has one end integrally extended from said main pressing portion and an opposed end being bent vertically and downwardly to form said forcing arm, wherein said main pressing portion is pivotally moved with respect to said forcing arm as a pivot point.

18. The passive rebound switch, as recited in claim 16, wherein said energy collecting module further comprises a pressing protrusion portion integrally protruded from a mid-portion of said main pressing portion for actuating said power generation module.

19. The passive rebound switch, as recited in claim 18, further comprising a paddling member coupled to said power generation module, wherein when said actuation button is actuated, said pressing protrusion portion of said power collecting module is driven to press against said paddling member so as to activate said power generation module.

20. The passive rebound switch, as recited in claim 1, wherein said power generation module is configured two consequent electrical energies that a first electrical energy is generated when said actuation button is moved from said idle position to said actuated position and a second electrical energy is generated when said actuation button is moved back to said idle position from said actuated position.

21. The passive rebound switch, as recited in claim 20, wherein said signal transmission module comprises an energy integrated circuit configured to combine said two consequent electrical energies from said power generation module.

22. A self-powering a passive rebound switch, comprising the steps of:
(a) applying an external force on at least an actuation button to move said actuation button in a reciprocated rebounding movement between an idle position and an actuated position;
(b) in response to said reciprocated rebounding movement of said actuation button, actuating at least a detection control and actuating an energy generation module at the same time, wherein said detection control is configured to detect said actuation button between said idle position and said actuated position, wherein said energy generation module being actuated and triggered for converting a mechanical energy of the external force into an electrical energy;
(c) pre-activating a signal transmission module by said detection control before said energy generation module generates the electrical energy; and
(d) transmitting a control signal by said signal transmission module after said signal transmission module is powered by said energy generation module.

23. The method, as recited in claim 22, wherein the step (b) further comprises the steps of:
- (b.1) generating a first electrical energy by said power generation module when said actuation button is actuated from said idle position to said actuated position so as to pre-activate said signal transmission module; and
- (b.2) generating a second electrical energy by said power generation module when said actuation button is moved back to said idle position from said actuated position so as to power said signal transmission module for transmitting said control signal.

24. The method as recited in claim 22 wherein, in the step (a), said actuation button is detachably and pivotally coupled at a housing to enable said actuation button being moved in said reciprocated rebounding movement.

25. The method, as recited in claim 22, further comprising a step of resetting said actuation button to move said actuation button back to said idle position from said actuated position.

\* \* \* \* \*